United States Patent
Wilkinson et al.

(10) Patent No.: US 10,592,642 B2
(45) Date of Patent: Mar. 17, 2020

(54) SYSTEMS AND METHODS FOR DECENTRALIZED CONTENT DISTRIBUTION

(71) Applicant: Walmart Apollo, LLC, Bentonville, AR (US)

(72) Inventors: Bruce W. Wilkinson, Rogers, AR (US); Charles Harry Lobo, Cave Springs, AR (US); Sid Shake, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/387,194

(22) Filed: Apr. 17, 2019

(65) Prior Publication Data

US 2019/0325115 A1    Oct. 24, 2019

Related U.S. Application Data

(60) Provisional application No. 62/659,826, filed on Apr. 19, 2018.

(51) Int. Cl.
*H04L 29/06* (2006.01)
*H04L 12/58* (2006.01)
(Continued)

(52) U.S. Cl.
CPC ............ *G06F 21/12* (2013.01); *G06F 21/602* (2013.01); *G06Q 20/085* (2013.01);
(Continued)

(58) Field of Classification Search
CPC ..... G06F 21/12; G06F 21/602; G06Q 20/085; H04L 9/0637
(Continued)

(56) References Cited

U.S. PATENT DOCUMENTS 9,338,148 B2   5/2016   Polehn
9,886,685 B2   2/2018   Keohane
(Continued)

FOREIGN PATENT DOCUMENTS

WO    2017127564    7/2017

OTHER PUBLICATIONS

Nakamoto, Satoshi; Bitcoin: A peer-to-peer electronic cash system; Oct. 31, 2008; pp. 1-9.
(Continued)

*Primary Examiner* — Haresh N Patel
(74) *Attorney, Agent, or Firm* — Fitch, Even, Tabin & Flannery LLP

(57) ABSTRACT

In some embodiments, systems, apparatuses, and methods are provided herein useful to automatically authorizing digital rights access. In some embodiments, the system comprises a content creator server, wherein the content creator server is configured to create a block, wherein the block includes the content, publish, to a public ledger, the block, wherein the public ledger comprises a blockchain, generate, for a user device, a key, wherein the key provides digital rights access to the block, and transmit, to the user device, the key, the user device configured to store a local copy of the public ledger, update the local copy of the public ledger to include the block, receive, from the content creator server, the key, and access, via the local copy of the public ledger with the key, the block, wherein access to the block allows the user device to make use of the content.

18 Claims, 9 Drawing Sheets

(51) Int. Cl.
    *G06F 21/62* (2013.01)
    *G06F 21/32* (2013.01)
    *G06F 21/12* (2013.01)
    *H04L 9/06* (2006.01)
    *G06Q 20/08* (2012.01)
    *G06F 21/60* (2013.01)

(52) U.S. Cl.
    CPC .... *H04L 9/0637* (2013.01); *G06F 2221/0755* (2013.01); *H04L 2209/38* (2013.01)

(58) Field of Classification Search
    USPC .......................................................... 726/28
    See application file for complete search history.

(56) References Cited

U.S. PATENT DOCUMENTS

| | | |
|---|---|---|
| 2016/0283920 A1 | 9/2016 | Fisher |
| 2016/0292672 A1 | 10/2016 | Fay |
| 2016/0321629 A1 | 11/2016 | McCoy |
| 2017/0116693 A1 | 4/2017 | Rae |
| 2017/0154331 A1 | 6/2017 | Voorhees |
| 2017/0177898 A1 | 6/2017 | Dillenberger |
| 2017/0221029 A1 | 8/2017 | Lund |
| 2017/0243193 A1 | 8/2017 | Manian |
| 2018/0094953 A1 | 4/2018 | Colson |
| 2019/0273725 A1* | 9/2019 | Allen ................... H04L 63/0421 |
| 2019/0279204 A1* | 9/2019 | Norton .................. H04L 9/0637 |
| 2019/0280854 A1* | 9/2019 | Wadhwa ............... H04L 9/3213 |
| 2019/0281026 A1* | 9/2019 | Mitchell ............... H04L 9/0891 |
| 2019/0287175 A1* | 9/2019 | Hill ...................... H04L 9/3236 |
| 2019/0288854 A1* | 9/2019 | Xie ........................ H04L 63/08 |
| 2019/0303541 A1* | 10/2019 | Reddy .................... G06F 21/12 |
| 2019/0303579 A1* | 10/2019 | Reddy ................... G06F 21/572 |
| 2019/0303622 A1* | 10/2019 | Versteeg ................ G06F 21/64 |
| 2019/0303623 A1* | 10/2019 | Reddy .................... G06F 16/27 |
| 2019/0304027 A1* | 10/2019 | Hu ........................ G06Q 40/08 |
| 2019/0305957 A1* | 10/2019 | Reddy ...................... G06F 8/60 |
| 2019/0305958 A1* | 10/2019 | Qiu ..................... G06Q 20/065 |
| 2019/0305959 A1* | 10/2019 | Reddy ...................... G06F 8/60 |
| 2019/0305966 A1* | 10/2019 | Qiu ....................... H04L 9/3247 |
| 2019/0306173 A1* | 10/2019 | Reddy ...................... G06F 8/71 |
| 2019/0312719 A1* | 10/2019 | Cheon ................... H04L 9/0861 |
| 2019/0317924 A1* | 10/2019 | Alimi .................... H04L 9/0891 |

OTHER PUBLICATIONS

PCT; App. No. PCT/US2019/026734; International Search Report and Written Opinion dated Jul. 3, 2019.

\* cited by examiner

SYSTEMS AND METHODS FOR DECENTRALIZED CONTENT DISTRIBUTION

CROSS-REFERENCE TO RELATED APPLICATION

This application claims the benefit of U.S. Provisional Application No. 62/659,826, filed Apr. 19, 2018, which is incorporated by reference in its entirety herein.

TECHNICAL FIELD

This invention relates generally to content distribution, and, more specifically, decentralized content distribution.

BACKGROUND

Currently, most content distribution systems are centralized. That is, a main server, or set of servers, operated by a content creator is tasked with distributing content to users (e.g., end users, beta testers, etc.). For example, a software manufacturer will create software, then make the software available for download from the software manufacturer's server. When a user wishes to purchase the software (or otherwise obtain the software even if it does not require payment), the user pays for the software (if necessary) then downloads the software from the software manufacturer's server. While these centralized systems are effective in that they allow users to obtain the software, they do have many drawbacks. For example, users may have difficulty downloading the software when there is high demand, the authenticity of the software cannot be ensured, users may be required to actively seek updates to software, and licensing possibilities are limited. These drawbacks are not limited to the distribution of software but can apply equally to the distribution of any digital content (e.g., movies, music, books, art, games, etc.). Consequently, a need exists for an updated content distribution system.

BRIEF DESCRIPTION OF THE DRAWINGS

Disclosed herein are embodiments of systems, apparatuses and methods pertaining to automatically authorizing digital rights access. This description includes drawings, wherein.

Figure 1:
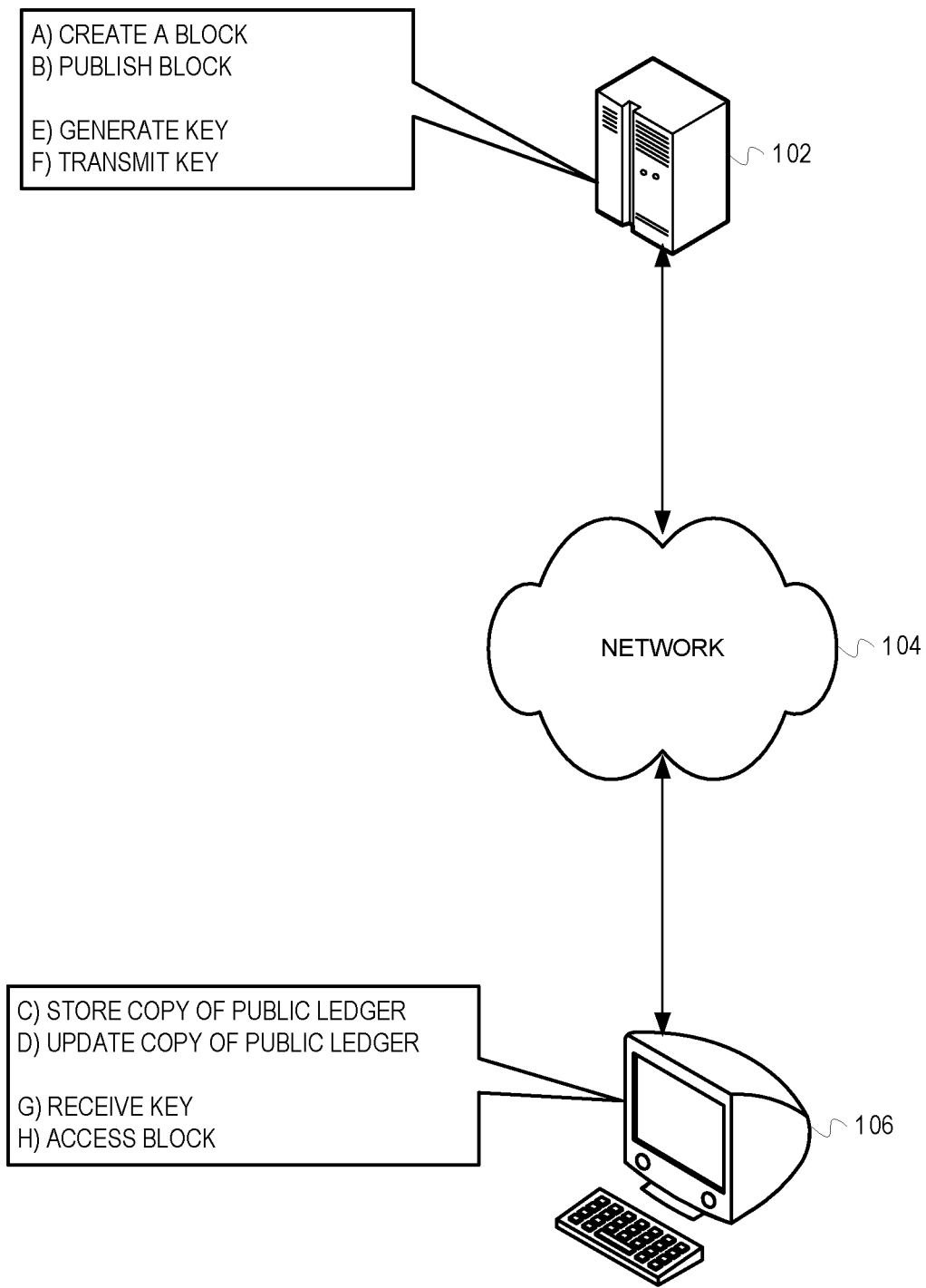
FIG. 1 depicts a decentralized content distribution system including a content creator server 102, a network 104, and a user device 106, according to some embodiments.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to various embodiments, systems, apparatuses and methods are provided herein useful to automatically authorizing digital rights access. In some embodiments, a system for automatically authorizing digital rights access comprises a content creator server communicatively coupled to a network, wherein the content creator server is configured to create, based on content, a block, wherein the block includes the content, publish, to a public ledger, the block, wherein the public ledger comprises a blockchain, generate, for a user device, a key, wherein the key provides digital rights access to the block, and transmit, to the user device via the network, the key, the user device communicatively coupled to the network, the user device configured to store a local copy of the public ledger, update, based on the publication of the block to the public ledger, the local copy of the public ledger to include the block, receive, from the content creator server, the key, and access, via the local copy of the public ledger with the key, the block, wherein access to the block allows the user device to make use of the content.

As previously discussed, most current content distribution systems are centralized. While these content distribution systems are effective in that they allow the distribution of content, they have many drawbacks. Embodiments of the systems, methods, and apparatuses disclosed herein seek to eliminate, or at least reduce, some of these drawbacks by way of a decentralized content distribution system. In some embodiments, a decentralized system includes one or more content creator servers, a network, and user devices. Instead of requiring users to obtain the content from the content creator servers, the content creator severs publish the content to a public ledger, such as a blockchain. User devices store local copies of the public ledger and the user can access the content via the local copy of the public ledger, obviating the need for the user to go acquire the content, ensuring the authenticity of the content, and generally making the process easier for the user. Additionally, in some embodiments, this decentralized distribution can be beneficial to content creators and/or distributors by reducing download volume, ensuring prompt delivery of content, etc. The discussion of FIG. 1 provides an overview of such a decentralized content distribution system.

FIG. 1 depicts a decentralized content distribution system including a content creator server 102, a network 104, and a user device 106, according to some embodiments. The example operations depicted in FIG. 1 include operations between the content creator server 102, the network 104, and the user device 106. FIG. 1 depicts operations at stages A-H. The stages are examples and are not necessarily discrete occurrences over time (e.g., the operations of different stages may overlap). Additionally, FIG. 1 is an overview of example operations.

At stage A, the content creator server 102 creates a block. The block can be a block in a blockchain. The block includes the content. For example, the content could be software (e.g., a computing device application), a software update (e.g., lines of code and a script to update an executable file to include the lines of code), music, a game, or any other suitable digital content. In some embodiments, the content creator server 102 automatically creates the block by packaging the content in the block. Additionally, the content creator server 102 can digitally sign the block to verify its authenticity, for example, using hash-based encryption.

At stage B, the content creator server 102 publishes the block to a public ledger. In some embodiments, the public ledger is a blockchain. In such embodiments, the content creator server can incorporate the block into the blockchain by adding the block to the blockchain structure and providing the required references to previous blocks (described in greater detail with respect to FIGS. 4-9). By including the content in the block, the content can be easily accessed by users. The content creator server 102 publishes the block via the network 104. The network can be any suitable network, such as the Internet. In some embodiments, the public ledger is specific to a single content creator (e.g., a specific software manufacturer, a recording studio, a movie studio, and artist, etc.). In such embodiments, the public ledger may include only content created by the single content creator. In other embodiments, the public ledger may include content from multiple content creators (i.e., published by content creator server associated with multiple entities). In such embodiments, the public ledger may include content from a group of content creators, such as all software manufacturers or a subset of software manufacturers. Accordingly, the public ledger may be specific to an industry (e.g., software manufacturers, record labels, etc.). Alternatively, the public ledger may specific to an entity (e.g., a company that owns a recording studio and a movie studio) or may allow for the publication of block provided by any entity.

At stage C, the user device stores a local copy of the public ledger. That is, a copy of the public ledger, as well as the content in each block of the public ledger, is stored on the user device 106 (e.g., on memory contained within the user device 106 (e.g., onboard memory), connected to the user device 106 (e.g., external memory), and/or remote from the user device (e.g., cloud-based memory associated with the user device 106)). In some embodiments, the local copy of the public ledger includes the entirety of the public ledger (e.g., all copies/versions/etc. of the content contained in the public ledger). In other embodiments, the local copy of the public ledger may include only a portion of the public ledger. For example, the local copy of the public ledger may include only content creators to which the user device 106 is subscribed or has licensed content, only current versions of content, a specified number of past versions of content, etc. Embodiments in which only a portion of the public ledger is included in the local copy of the public ledger stored on the user device 106 may reduce the amount of data stored on the user device 106.

At stage D, the user device 106 updates the local copy of the public ledger. That is, once the content creator server 102 publishes the block to the public ledger, the user device 106 updates the local copy of the public ledger to include the block. In some embodiments, the user device 106 can actively seek updates to the public ledger (i.e., the addition of new blocks to the public ledger). In such pull-type paradigms, the user device 106 may automatically seek updates at predetermined intervals (e.g., once a week, every day at 3 AM, upon activation of a particular application, etc.). Alternatively, in some embodiments, the user device 106 may receive a notification when the public ledger is updated. For example, the content creator server 102, or another actor (e.g., a third-party service), can transmit a notification to the user device 106 when a new block is published to the public ledger. As previously discussed, in some embodiments, the local copy of the public ledger includes the entirety of the public ledger. In such embodiments, the user device 106 simply updates the local copy of the public ledger by adding the block to the public ledger. In embodiments in which only a portion of the public ledger is included in the local copy of the public ledger, the user device 106, upon adding a new block to the local copy of the public ledger, may remove other blocks (or the content of the blocks, but maintain the block for consistency and integrity purposes) to limit the amount of data stored on the user device 106.

At stage E, the content creator server 102 generates a key. The key allows the user device 106 to access the block. The key can include any suitable type of security features. For example, in one embodiment, the key generated by the content creator server 102 is a private key in a public/private key system. In such embodiments, the content creator server 102 can encrypt the block using a public key. Once encrypted, access to the block is restricted without a corresponding private key. The content creator server 102 generates the private key to allow access to the block, and the content contained in the block. In some embodiments, the content creator server 102 may generate keys based on payment from users or confirmation of payment to a third party (e.g., a payment service), authorization of users, agreements with users, etc. For example, when a user pays for the content, the content creator server 102 may generate the key for the user. Alternatively, the content creator server 102 may generate keys before they are requested. In such embodiments, the content creator server 102 generates the keys and stores the keys until a requesting party is authorized (e.g., payment is received from a requesting party or the identity of the requesting party is determined).

At stage F, the content creator server 102 transmits the key to the user device 106. As previously discussed, a user may need to pay for the content, or be otherwise authorized to access the content, before the user can receive the key. Once the user, or the user device 106 associated with the user, is authorized or payment is received, the content creator server 102 transmits the key to the user device 106.

At stage G, the user device 106 receives the key from the content creator server 102. For example, the user device 106 can receive the key from the content creator server 102 via the network 104.

At stage H, the user device 106 accesses the block. That is, the user device 106 uses the key to access the locally stored block. By accessing the block, the user device 106 can make use of the content. For example, the user device 106 can make use of the content by executing the software, presenting media associated with the content, etc.

In some embodiments, the decentralized content distribution system only implements stages A-D and H. That is, once the user device 106 updates the local copy of the public ledger, no action is required of the system for a user to access the software.

Figure 2:
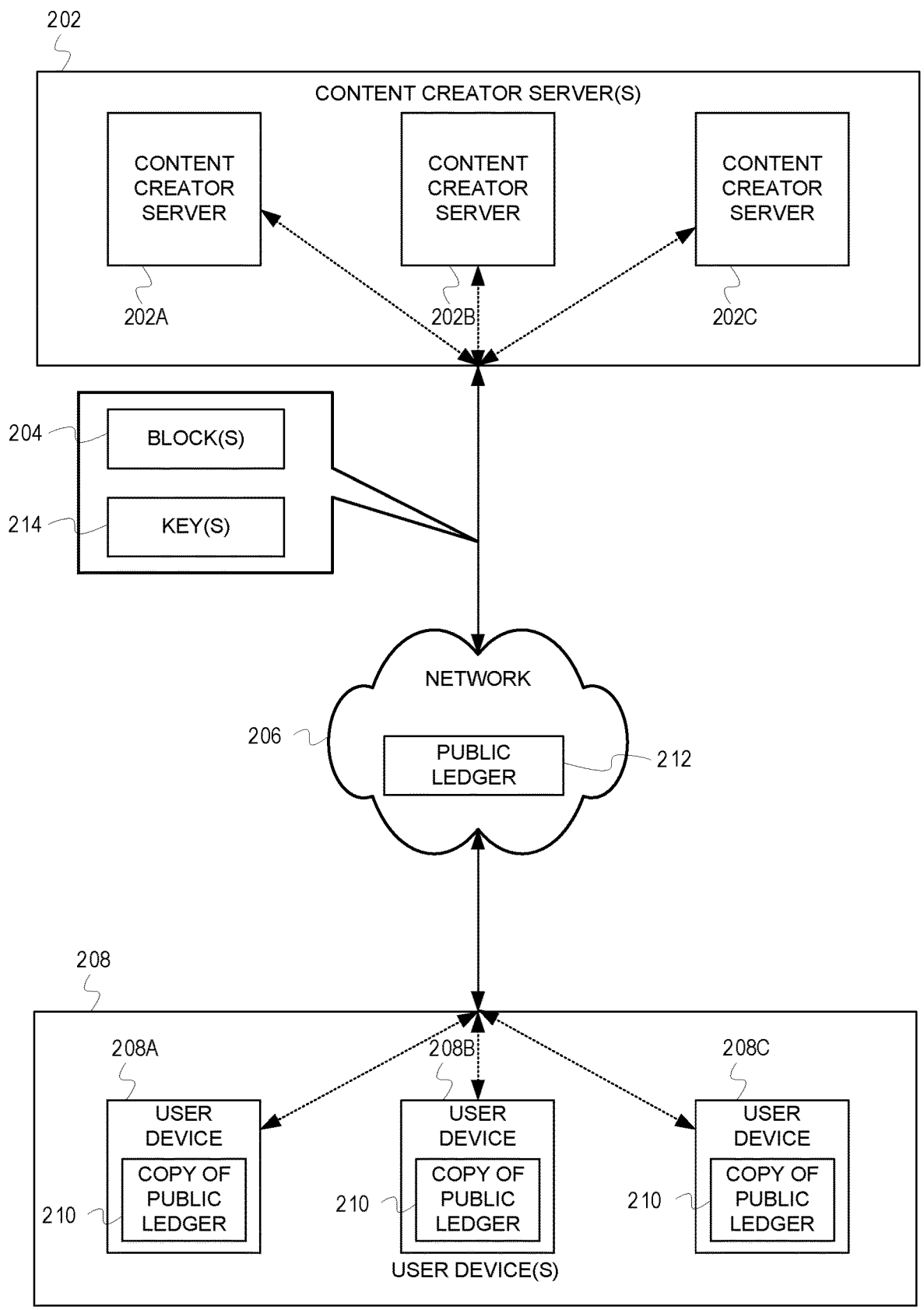
FIG. 2 is a block diagram of a decentralized content distribution system including a content creator server 202, a network 206, and user devices 208, according to some embodiments.

While FIG. 1 and the associated text provide an overview of a system for decentralized content distribution, the discussion of FIG. 2 provides additional details regarding such a system.

FIG. 2 is a block diagram of a decentralized content distribution system including a content creator server 202, a network 206, and user devices 208, according to some embodiments. The content creator server 202 and the user devices 208 are connected to the network 206. The network 206 can be any network suitable for communicatively connecting these devices, such as the Internet. The content creator server 202 can include multiple content creator servers 202A, 202B, and 202C. The multiple content creator servers 202A, 202B, and 202C can be associated with the same content creator or different content creators. For example, content creator servers 202A, 202B, and 202C can be associated with Content Creator$_1$, Content Creator$_2$, and Content Crreator$_3$, respectively. Additionally, some, or all, of the content creator servers 202A, 202B, and 202C can be associated with a single content creator.

The content creator (or content creators) create content. The content can be any suitable type of digital content, such as software, media, etc. The content creator server creates a block 204. The block 204 contains the content. That is, for example, if the content is software, the block 204 contains the software. The content creator server 202 publishes the block to a public ledger 212. In FIG. 2, the public ledger 212 is depicted as residing within the network 206. Such depiction is done for exemplary purposes indicating that the public ledger 212 can be stored on any suitable device. In some embodiments, the public ledger 212 is stored redundantly on a number of devices connected to the network 206.

The user devices 208 can include any number of user devices 208, as depicted by multiple user devices 208A, 208B, and 208C in FIG. 2. Each of the user devices 208 includes a copy of the public ledger 210. The copy of the public ledger includes the blocks that comprise the public ledger 210 and thus the content contained within the public ledger 210. Accordingly, all a user device 208 needs to access the content is digital rights access. The digital rights access can be granted based on any suitable criteria. For example, the criteria may include payment, authorization, etc. In some embodiments, the content of the block 204 is secured via encryption. Such encryption can be hash-based, password-based, etc. In the embodiment depicted in FIG. 2, the content of the block 204 is secured via a public/private key system. That is, access to the block 204, and thus the content, is restricted based on a public/private key system. A user device 208 accesses the content via a key 214. In some embodiments, the key is generated and distributed by the content creator server 202. For example, the user device 208 can transmit payment to, or otherwise be authenticated by, the content creator server 202. The user device 208 then access the block 204 with the key 214 to make us of the content contained in the block 204.

Figure 3:
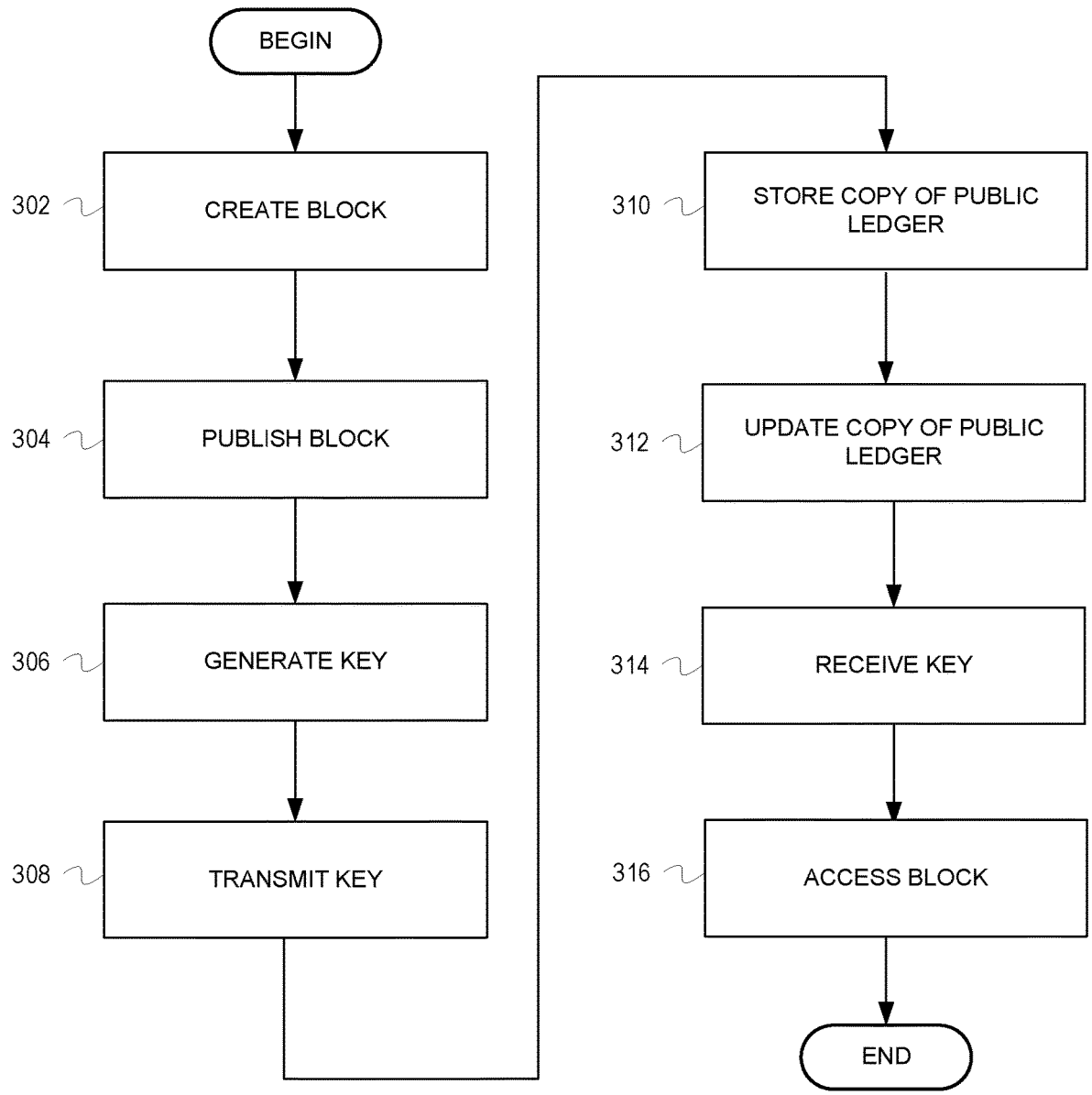
FIG. 3 is a flowchart depicting example operations for automatically authorizing digital rights access, according to some embodiments.

While the discussion of FIG. 2 provides additional detail regarding a system for decentralized content distribution, the discussion of FIG. 3 provides example operations for automatically authorizing digital right access.

FIG. 3 is a flowchart depicting example operations for automatically authorizing digital rights access, according to some embodiments. The flow begins at block 302.

At block 302, a block is created. For example, a content creator server can create the block. The block can be a piece of a public ledger, such as a blockchain. The block includes the content. That is, for example, if the content is a digital audio file, the block contains the digital audio file. The flow continues at block 304.

At block 304, the block is published. For example, the content creator server can publish the block. In the case where the public ledger comprises a blockchain, the content creator server publishes the block by adding the block to the blockchain. The flow continues at block 306.

At block 306, a key is generated. For example, the content creator server can create the key. While the content creator server is generally referred to as creating the key, this can include devices other than that which publish blocks to the public ledger. For example, the recitation that the content creator server generates the key is meant to include any other device suitable for generating the key that is associated with, or authorized to generate the key, by the content creator. The key can be anything suitable to allow access to the block. For example, the key can be a password or passcode, a hash key, a private key, a digital signature, a link, etc. The flow continues at block 308.

At block 308, the key is transmitted. For example, the content creator server can transmit the key. Just as the content creator server is generally referred to as generating the key, the reference to transmission of the key is meant to include any other device suitable for transmitting the key that is associated with, or authorized to transmit the key, by the content creator. The content creator server transmits the key to a user device. In some embodiments, the user device must be authorized to receive the key. For example, the user device may be authorized to receive the key after payment is received, the identity of the user device is determined, or any other suitable type of authorization. The flow continues at block 310.

At block 310, a copy of the public ledger is stored. For example, the user device can store a copy of the public ledger. The user device can store a copy of the public ledger on memory contained within the user device, memory connected to the user device, and/or memory associated with the user device (e.g., cloud-based storage). For purposes of this disclosure, any such type of storage of the copy of the public ledger is storage of a local copy of the public ledger. The copy of the public ledger includes some or all of the data included in the public ledger. For example, the copy of the public ledger can include some or all of the blocks of the public ledger. The flow continues at block 312.

At block 312, the copy of the public ledger is updated. For example, the user device can update the copy of the public ledger. In some embodiments, the user device checks for updates to the public ledger (e.g., new blocks added to the public ledger) on a periodic and/or scheduled basis. Additionally, or alternatively, the user device can receive a notification when the public ledger is updated. In either case, the user device updates the copy of the public ledger by adding any new content from the public ledger to the copy of the public ledger. For example, the user device can add the block to the copy of the public ledger. The flow continues at block 316.

At block 316, the block is accessed. For example, the user device accesses the block. In embodiments in which the block is secured (e.g., encrypted, password protected, etc.), the user device accesses the block via the key. The user device accesses the block to make use of the content. The user device makes use of the content by presenting the content, executing the content, sharing the content, modifying the content, incorporating the content with a file or files on the user device, etc.

In some embodiments, a system for automatically authorizing digital rights access comprises a content creator server communicatively coupled to a network, wherein the content creator server is configured to create, based on content, a block, wherein the block includes the content, publish, to a public ledger, the block, wherein the public ledger comprises a blockchain, generate, for a user device, a key, wherein the key provides digital rights access to the block, and transmit, to the user device via the network, the key, the user device communicatively coupled to the network, the user device configured to store a local copy of the public ledger, update, based on the publication of the block to the public ledger, the local copy of the public ledger to include the block, receive, from the content creator server, the key, and access, via the local copy of the public ledger with the key, the block, wherein access to the block allows the user device to make use of the content.

While the discussion of FIGS. 1-3 describes a decentralized content distribution system, descriptions of some embodiments of blockchain technology are provided with reference to FIG. 4-9 herein. In some embodiments described above, blockchain technology may be utilized to record distribution of content in a decentralized system. One or more of the servers and devices described herein may comprise a node in a distributed blockchain system storing a copy of the blockchain record. Updates to the blockchain may comprise addition of blocks containing content and one or more nodes on the system may be configured to incorporate one or more updates into blocks to add to the distributed database.

Distributed database and shared ledger database generally refer to methods of peer-to-peer record keeping and authentication in which records are kept at multiple nodes in the peer-to-peer network instead of kept at a trusted party. A blockchain may generally refer to a distributed database that maintains a growing list of records in which each block contains a hash of some or all previous records in the chain to secure the record from tampering and unauthorized revision. A hash generally refers to a derivation of original data. In some embodiments, the hash in a block of a blockchain may comprise a cryptographic hash that is difficult to reverse and/or a hash table. Blocks in a blockchain may further be secured by a system involving one or more of a distributed timestamp server, cryptography, public/private key authentication and encryption, proof standard (e.g. proof-of-work, proof-of-stake, proof-of-space), and/or other security, consensus, and incentive features. In some embodiments, a block in a blockchain may comprise one or more of a data hash of the previous block, a timestamp, a cryptographic nonce, a proof standard, and a data descriptor to support the security and/or incentive features of the system.

In some embodiments, a blockchain system comprises a distributed timestamp server comprising a plurality of nodes configured to generate computational proof of record integrity and the chronological order of its use for content, trade, and/or as a currency of exchange through a peer-to-peer network. In some embodiments, when a blockchain is updated, a node in the distributed timestamp server system takes a hash of a block of items to be timestamped and broadcasts the hash to other nodes on the peer-to-peer network. The timestamp in the block serves to prove that the data existed at the time in order to get into the hash. In some embodiments, each block includes the previous timestamp in its hash, forming a chain, with each additional block reinforcing the ones before it. In some embodiments, the network of timestamp server nodes performs the following steps to add a block to a chain: 1) new activities are broadcasted to all nodes, 2) each node collects new activities into a block, 3) each node works on finding a difficult proof-of-work for its block, 4) when a node finds a proof-of-work, it broadcasts the block to all nodes, 5) nodes accept the block only if activities are authorized, and 6) nodes express their acceptance of the block by working on creating the next block in the chain, using the hash of the accepted block as the previous hash. In some embodiments, nodes may be configured to consider the longest chain to be the correct one and work on extending it. A digital currency implemented on a blockchain system is described by Satoshi Nakamoto in "Bitcoin: A Peer-to-Peer Electronic Cash System" (http://bitcoin.org/bitcoin.pdf), the entirety of which is incorporated herein by reference.

Figure 4:
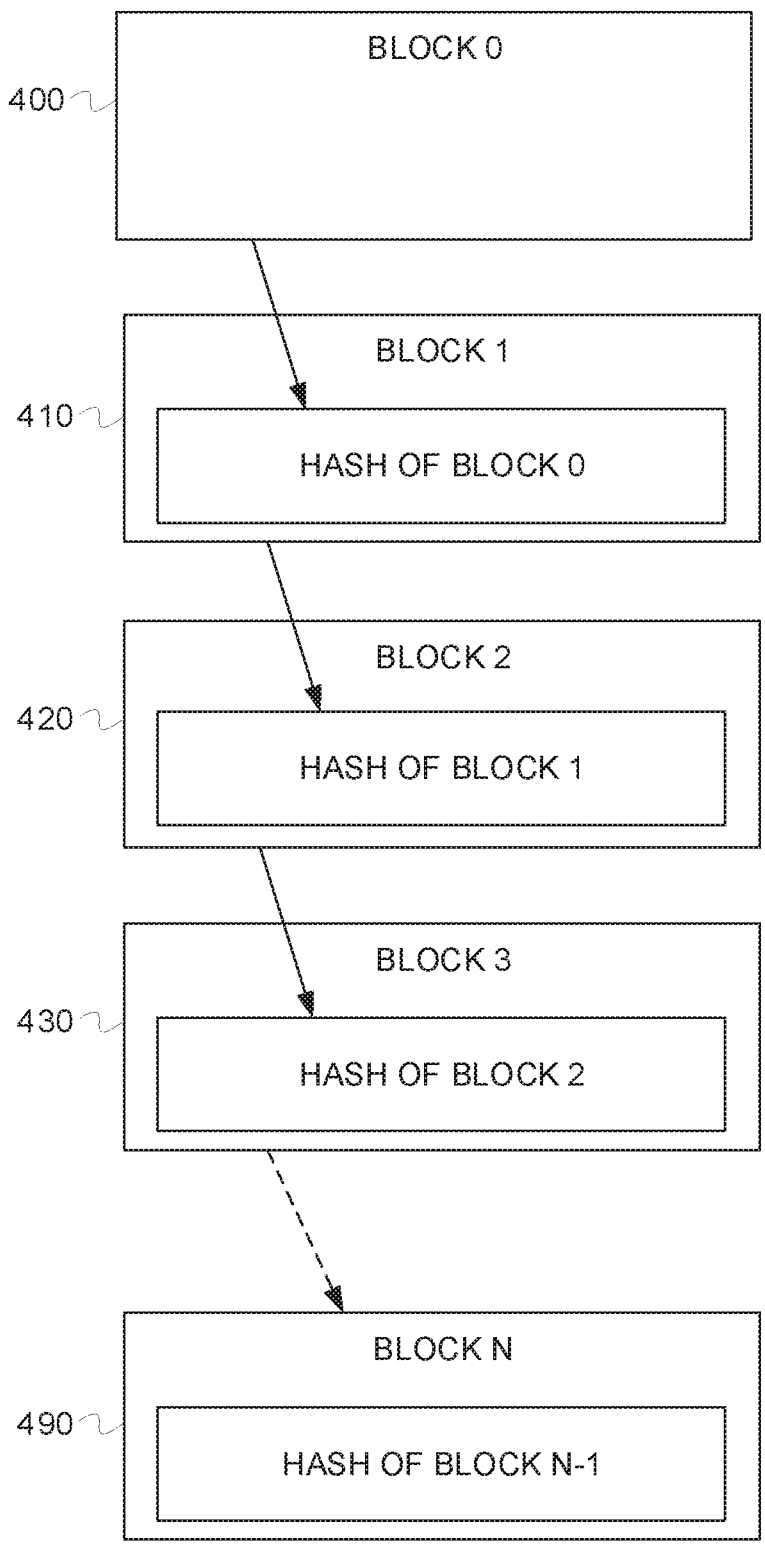
FIG. 4 depicts an illustration of blocks, according to some embodiments.

Now referring to FIG. 4, an illustration of a blockchain according to some embodiments is shown. In some embodiments, a blockchain comprises a hash chain or a hash tree in which each block added in the chain contains a hash of the previous block. In FIG. 4, block 0 200200 represents a genesis block of the chain. Block 1 410 contains a hash of block 0 400, block 2 420 contains a hash of block 1 410, block 3 430 contains a hash of block 2 420, and so forth. Continuing down the chain, block N 490 contains a hash of block N-1. In some embodiments, the hash may comprise the header of each block. Once a chain is formed, modifying or tampering with a block in the chain would cause detectable disparities between the blocks. For example, if block 1 is modified after being formed, block 1 would no longer match the hash of block 1 in block 2. If the hash of block 1 in block 2 is also modified in an attempt to cover up the change in block 1, block 2 would not then match with the hash of block 2 in block 3. In some embodiments, a proof standard (e.g. proof-of-work, proof-of-stake, proof-of-space, etc.) may be required by the system when a block is formed to increase the cost of generating or changing a block that could be authenticated by the consensus rules of the distributed system, making the tampering of records stored in a blockchain computationally costly and essentially impractical. In some embodiments, a blockchain may comprise a hash chain stored on multiple nodes as a distributed database and/or a shared ledger, such that modifications to any one copy of the chain would be detectable when the system attempts to achieve consensus prior to adding a new block to the chain. In some embodiments, a block may generally contain any type of data and record. In some embodiments, each block may comprise a plurality of transaction and/or activity records.

In some embodiments, blocks may contain rules and data for authorizing different types of actions and/or parties who can take action. In some embodiments, transaction and block forming rules may be part of the software algorithm on each node. When a new block is being formed, any node on the system can use the prior records in the blockchain to verify whether the requested action is authorized. For example, a block may contain a public key of an owner of an asset that allows the owner to show possession and/or transfer the asset using a private key. Nodes may verify that the owner is in possession of the asset and/or is authorized to transfer the asset based on prior transaction records when a block containing the transaction is being formed and/or verified. In some embodiments, rules themselves may be stored in the blockchain such that the rules are also resistant to tampering once created and hashed into a block. In some embodiments, the blockchain system may further include incentive features for nodes that provide resources to form blocks for the chain. For example, in the Bitcoin system, "miners" are nodes that compete to provide proof-of-work to form a new block, and the first successful miner of a new block earns Bitcoin currency in return.

Figure 5:
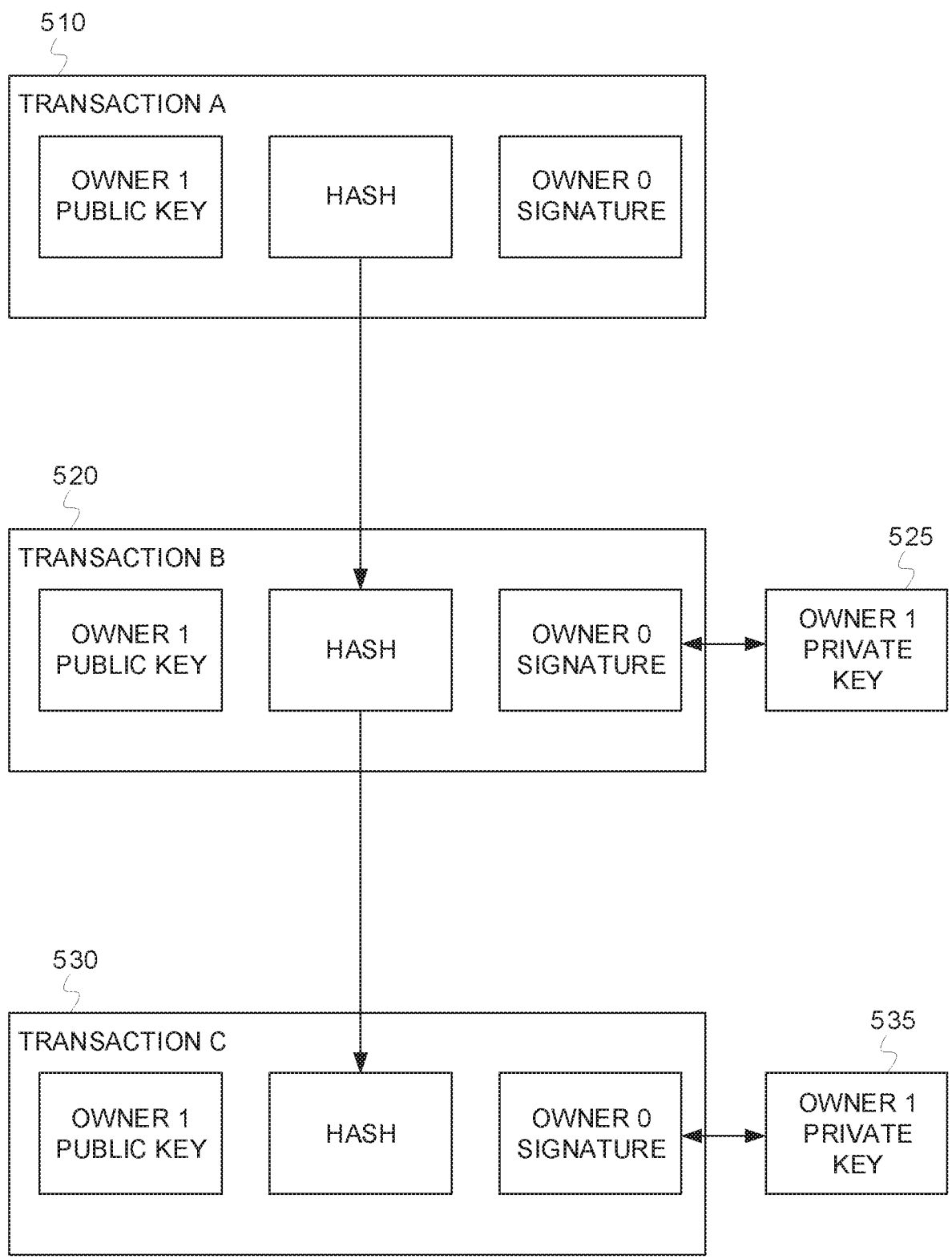
FIG. 5 depicts an illustration of transactions, according to some embodiments.

Now referring to FIG. 5, an illustration of blockchain-based transactions according to some embodiments is shown. In some embodiments, the blockchain illustrated in FIG. 5 comprises a hash chain protected by private/public key encryption. Transaction A 510 represents a transaction recorded in a block of a blockchain showing that owner 1 (recipient) obtained an asset from owner 0 (sender). Transaction A 510 contains owner's 1 public key and owner 0's signature for the transaction and a hash of a previous block. When owner 1 transfers the asset to owner 2, a block containing transaction B 520 is formed. The record of transaction B 520 comprises the public key of owner 2 (recipient), a hash of the previous block, and owner 1's signature for the transaction that is signed with the owner 1's private key 525 and verified using owner 1's public key in transaction A 510. When owner 2 transfers the asset to owner 3, a block containing transaction C 530 is formed. The record of transaction C 530 comprises the public key of owner 3 (recipient), a hash of the previous block, and owner 2's signature for the transaction that is signed by owner 2's private key 535 and verified using owner 2's public key from transaction B 520. In some embodiments, when each transaction record is created, the system may check previous transaction records and the current owner's private and public key signature to determine whether the transaction is valid. In some embodiments, transactions are being broadcasted in the peer-to-peer network and each node on the system may verify that the transaction is valid prior to adding the block containing the transaction to their copy of the blockchain. In some embodiments, nodes in the system may look for the longest chain in the system to determine the most up-to-date transaction record to prevent the current owner from double spending the asset. The transactions in FIG. 5 are shown as an example only. In some embodiments, a blockchain record and/or the software algorithm may comprise any type of rules that regulate who and how the chain may be extended. In some embodiments, the rules in a blockchain may comprise clauses of a smart contract that is enforced by the peer-to-peer network.

Figure 6:
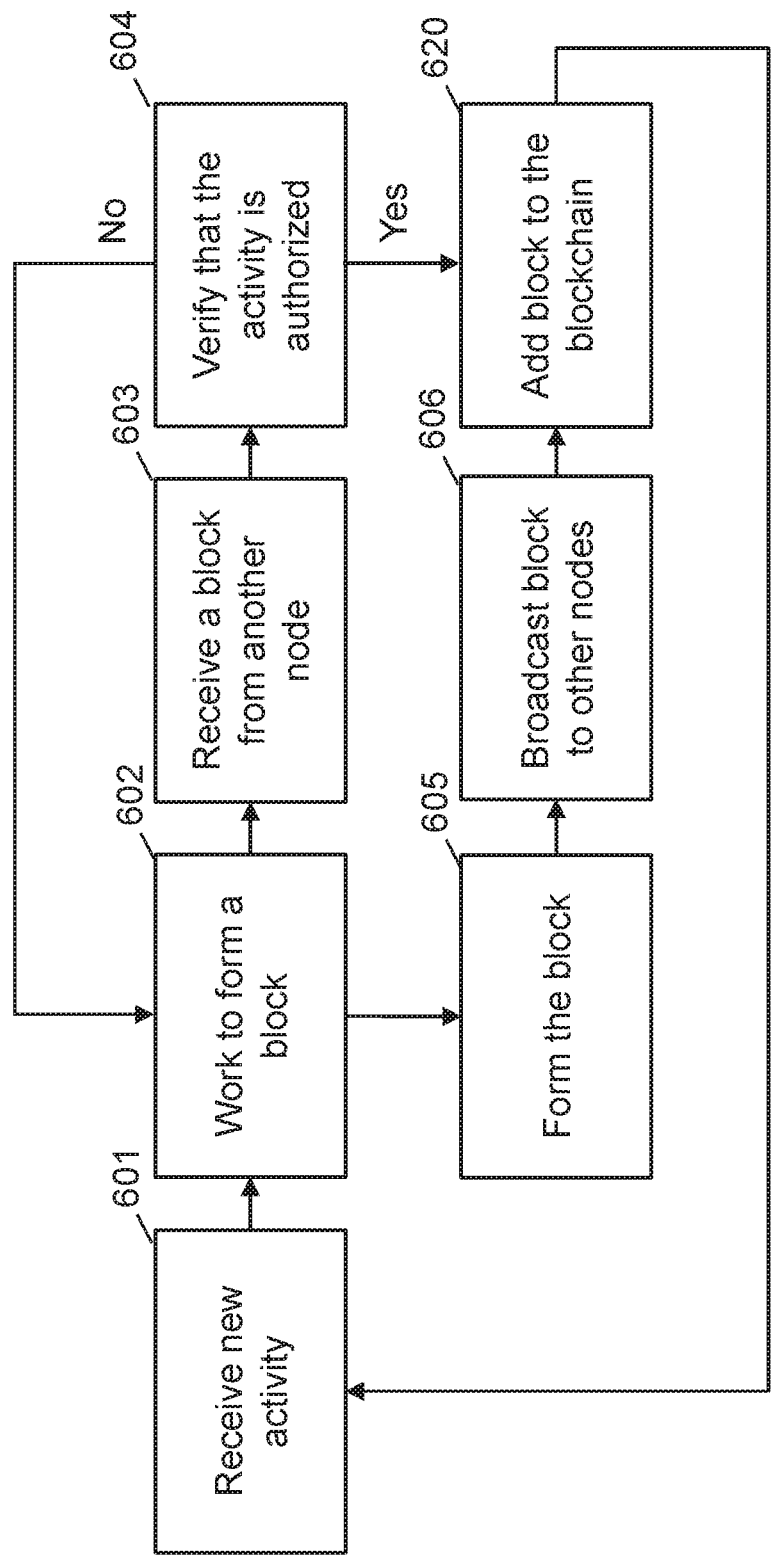
FIG. 6 depicts a flow diagram, according to some embodiments.

Now referring to FIG. 6, a flow diagram according to some embodiments is shown. In some embodiments, the steps shown in FIG. 6 may be performed by a processor-based device, such as a computer system, a server, a distributed server, a timestamp server, a blockchain node, and the like. In some embodiments, the steps in FIG. 6 may be performed by one or more of the nodes in a system using blockchain for record keeping.

In step 601, a node receives a new activity. The new activity may comprise an update to the record being kept in the form of a blockchain. In some embodiments, for blockchain supported digital or physical asset record keeping, the new activity may comprise a asset transaction. In some embodiments, the new activity may be broadcasted to a plurality of nodes on the network prior to step 601. In step 602, the node works to form a block to update the blockchain. In some embodiments, a block may comprise a plurality of activities or updates and a hash of one or more previous block in the blockchain. In some embodiments, the system may comprise consensus rules for individual transactions and/or blocks and the node may work to form a block that conforms to the consensus rules of the system. In some embodiments, the consensus rules may be specified in the software program running on the node. For example, a node may be required to provide a proof standard (e.g. proof of work, proof of stake, etc.) which requires the node to solve a difficult mathematical problem for form a nonce in order to form a block. In some embodiments, the node may be configured to verify that the activity is authorized prior to working to form the block. In some embodiments, whether the activity is authorized may be determined based on records in the earlier blocks of the blockchain itself After step 602, if the node successfully forms a block in step 605 prior to receiving a block from another node, the node broadcasts the block to other nodes over the network in step 606. In some embodiments, in a system with incentive features, the first node to form a block may be permitted to add incentive payment to itself in the newly formed block. In step 620, the node then adds the block to its copy of the blockchain. In the event that the node receives a block formed by another node in step 603 prior to being able to form the block, the node works to verify that the activity recorded in the received block is authorized in step 604. In some embodiments, the node may further check the new block against system consensus rules for blocks and activities to verify whether the block is properly formed. If the new block is not authorized, the node may reject the block update and return to step 602 to continue to work to form the block. If the new block is verified by the node, the node may express its approval by adding the received block to its copy of the blockchain in step 620. After a block is added, the node then returns to step 601 to form the next block using the newly extended blockchain for the hash in the new block.

In some embodiments, in the event one or more blocks having the same block number is received after step 620, the node may verify the later arriving blocks and temporarily store these blocks if they pass verification. When a subsequent block is received from another node, the node may then use the subsequent block to determine which of the plurality of received blocks is the correct/consensus block for the blockchain system on the distributed database and update its copy of the blockchain accordingly. In some embodiments, if a node goes offline for a time period, the node may retrieve the longest chain in the distributed system, verify each new block added since it has been offline, and update its local copy of the blockchain prior to proceeding to step 601.

Figure 7:
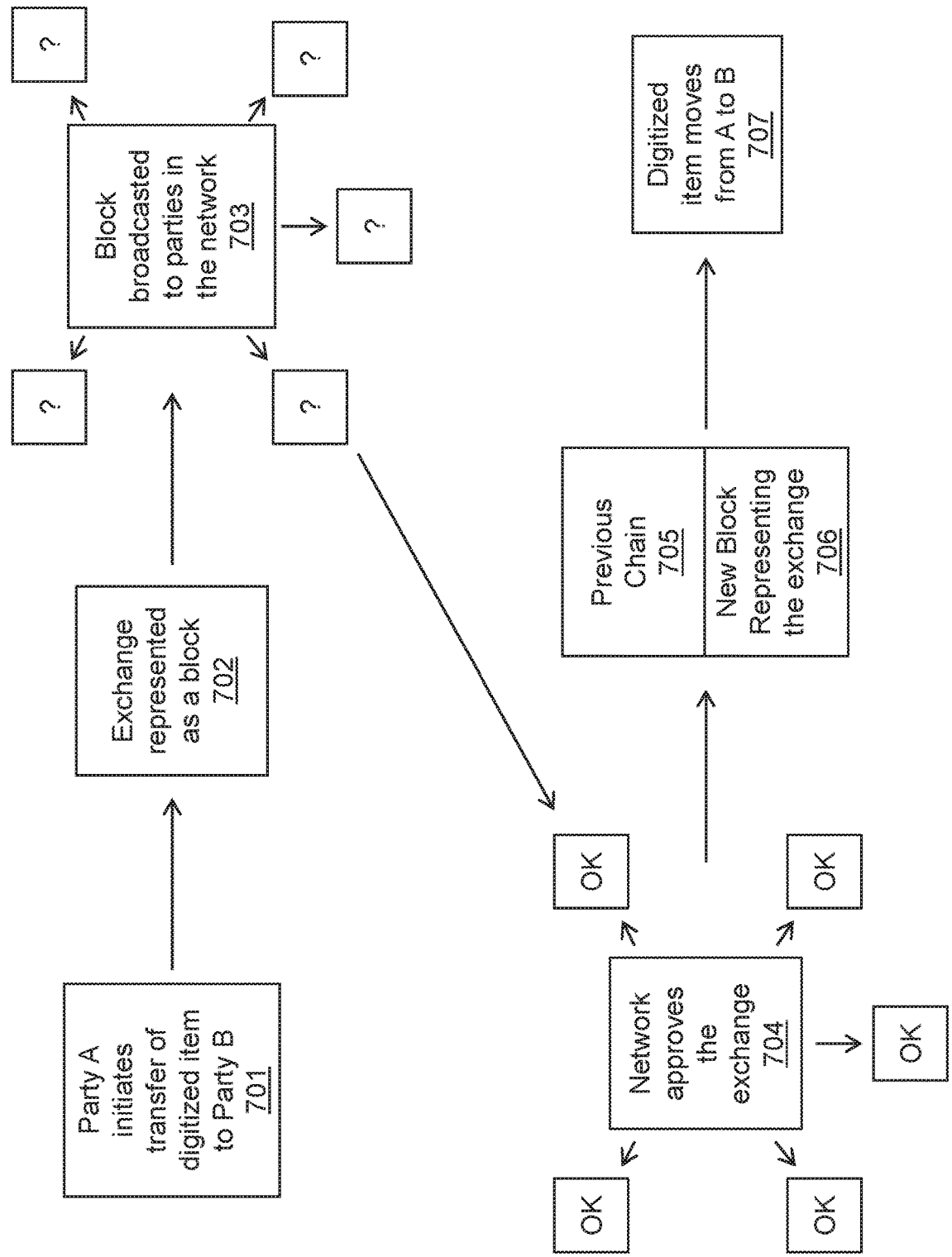
FIG. 7 depicts a process diagram, according to some embodiments.

Now referring to FIG. 7, a process diagram a blockchain update according to some implementations in shown. In step 701, party A initiates the transfer of a digitized item to party B. In some embodiments, the digitized item may comprise a digital currency, a digital asset, a document, rights to a physical asset, etc. In some embodiments, Party A may prove that he has possession of the digitized item by signing the transaction with a private key that may be verified with a public key in the previous transaction of the digitized item. In step 702, the exchange initiated in step 701 is represented as a block. In some embodiments, the transaction may be compared with transaction records in the longest chain in the distributed system to verify part A's ownership. In some embodiments, a plurality of nodes in the network may compete to form the block containing the transaction record. In some embodiments, nodes may be required to satisfy proof-of-work by solving a difficult mathematical problem to form the block. In some embodiments, other methods of proof such as proof-of-stake, proof-of-space, etc. may be used in the system. In some embodiments, the node that is first to form the block may earn a reward for the task as incentive. For example, in the Bitcoin system, the first node to provide prove of work to for block the may earn a Bitcoin. In some embodiments, a block may comprise one or more transactions between different parties that are broadcasted to the nodes. In step 703, the block is broadcasted to parties in the network. In step 704, nodes in the network approve the exchange by examining the block that contains the exchange. In some embodiments, the nodes may check the solution provided as proof-of-work to approve the block. In some embodiments, the nodes may check the transaction against the transaction record in the longest blockchain in the system to verify that the transaction is valid (e.g. party A is in possession of the asset he/she s seeks to transfer). In some embodiments, a block may be approved with consensus of the nodes in the network. After a block is approved, the new block 706 representing the exchange is added to the existing chain 705 comprising blocks that chronologically precede the new block 706. The new block 706 may contain the transaction(s) and a hash of one or more blocks in the existing chain 705. In some embodiments, each node may then update their copy of the blockchain with the new block and continue to work on extending the chain with additional transactions. In step 707, when the chain is updated with the new block, the digitized item is moved from party A to party B.

Figure 8:
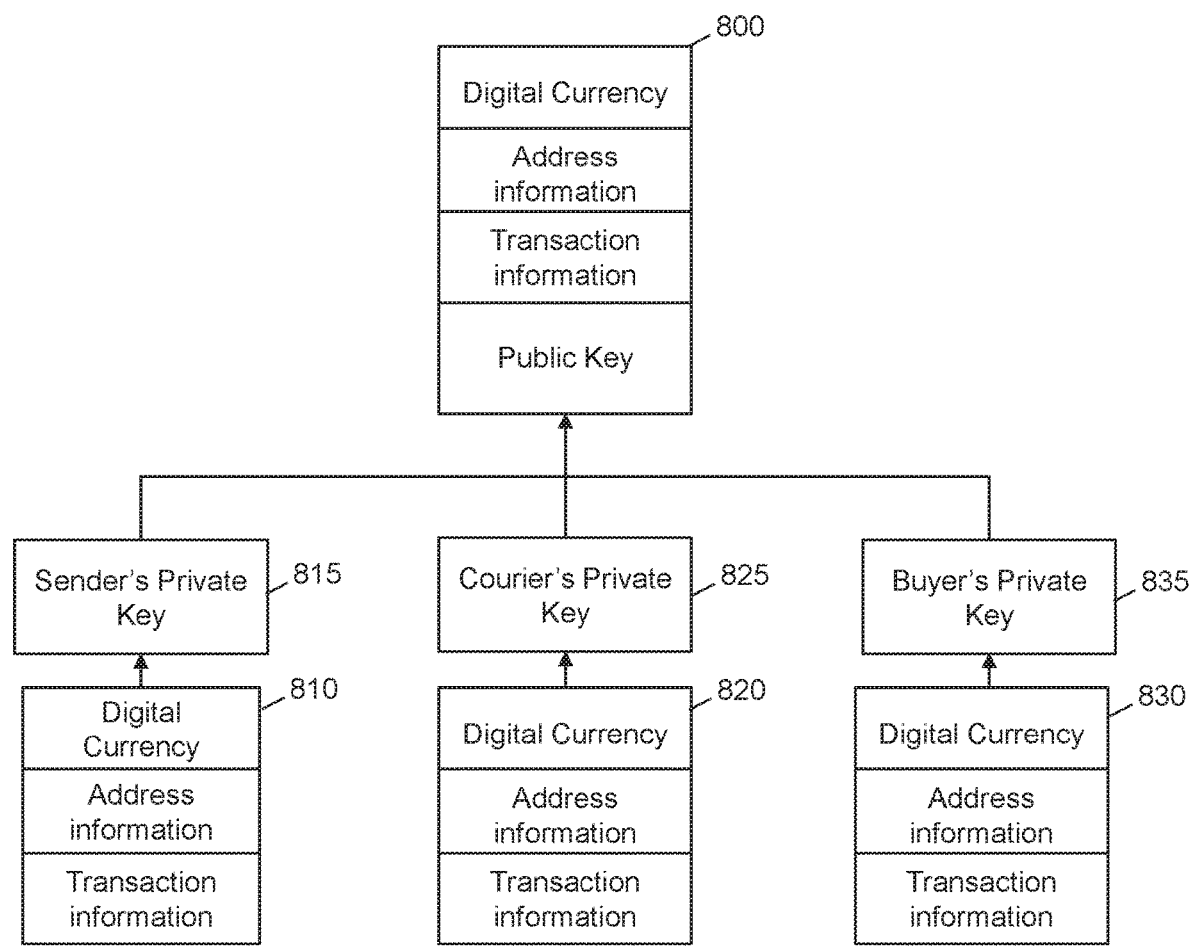
FIG. 8 depicts an illustration of a delivery record, according to some embodiments.

Now referring to FIG. 8, a diagram of a blockchain according to some embodiments in shown. FIG. 8 comprises an example of an implementation of a blockchain system for delivery service record keeping. The delivery record 800 comprises digital currency information, address information, transaction information, and a public key associated with one or more of a sender, a courier, and a buyer. In some embodiments, nodes associated the sender, the courier, and the buyer may each store a copy of the delivery record 810, 820, and 830 respectively. In some embodiments, the delivery record 800 comprises a public key that allows the sender, the courier, and/or the buyer to view and/or update the delivery record 800 using their private keys 815, 825, and the 835 respectively. For example, when a package is transferred from a sender to the courier, the sender may use the sender's private key 815 to authorize the transfer of a digital asset representing the physical asset from the sender to the courier and update the delivery record with the new transaction. In some embodiments, the transfer from the seller to the courier may require signatures from both the sender and the courier using their respective private keys. The new transaction may be broadcasted and verified by the sender, the courier, the buyer, and/or other nodes on the system before being added to the distributed delivery record blockchain. When the package is transferred from the courier to the buyer, the courier may use the courier's private key 825 to authorize the transfer of the digital asset representing the physical asset from the courier to the buyer and update the delivery record with the new transaction. In some embodiments, the transfer from the courier to the buyer may require signatures from both the courier and the buyer using their respective private keys. The new transaction may be broadcasted and verified by the sender, the courier, the buyer, and/or other nodes on the system before being added to the distributed delivery record blockchain.

With the scheme shown in FIG. 8, the delivery record may be updated by one or more of the sender, courier, and the buyer to form a record of the transaction without a trusted third party while preventing unauthorized modifications to the record. In some embodiments, the blockchain-based transactions may further function to include transfers of digital currency with the completion of the transfer of physical asset. With the distributed database and peer-to-peer verification of a blockchain system, the sender, the courier, and the buyer can each have confidence in the authenticity and accuracy of the delivery record stored in the form of a blockchain.

Figure 9:
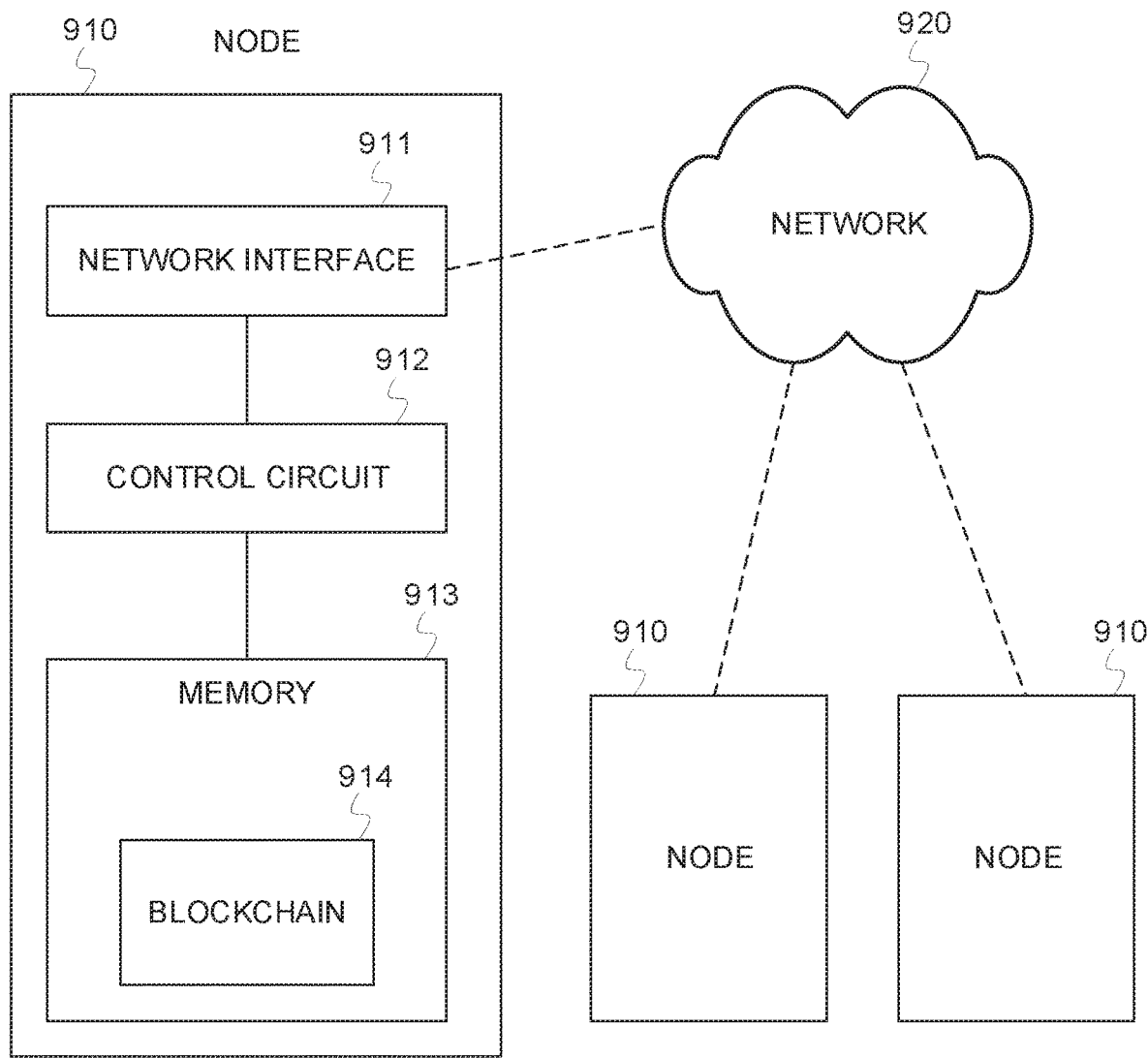
FIG. 9 depicts a system diagram configured, according to some embodiments.

Now referring to FIG. 9, a system according to some embodiments is shown. A distributed blockchain system comprises a plurality of nodes 910 communicating over a network 920. In some embodiments, the nodes 910 may be comprise a distributed blockchain server and/or a distributed timestamp server. In some embodiments, one or more nodes 910 may comprise or be similar to a "miner" device on the Bitcoin network. Each node 910 in the system comprises a network interface 911, a control circuit 912, and a memory 913.

The control circuit 912 may comprise a processor, a microprocessor, and the like and may be configured to execute computer-readable instructions stored on a computer-readable storage memory 913. The computer-readable storage memory may comprise volatile and/or non-volatile memory and have stored upon it a set of computer-readable instructions which, when executed by the control circuit 912, causes the node 910 update the blockchain 914 stored in the memory 913 based on communications with other nodes 910 over the network 920. In some embodiments, the control circuit 912 may further be configured to extend the blockchain 914 by processing updates to form new blocks for the blockchain 914. Generally, each node may store a version of the blockchain 914, and together, may form a distributed database. In some embodiments, each node 910 may be configured to perform one or more steps described with reference to FIGS. 8-9 herein.

The network interface 911 may comprise one or more network devices configured to allow the control circuit to receive and transmit information via the network 920. In some embodiments, the network interface 911 may comprise one or more of a network adapter, a modem, a router, a data port, a transceiver, and the like. The network 920 may comprise a communication network configured to allow one or more nodes 910 to exchange data. In some embodiments, the network 920 may comprise one or more of the Internet, a local area network, a private network, a virtual private network, a home network, a wired network, a wireless network, and the like. In some embodiments, the system does not include a central server and/or a trusted third party system. Each node in the system may enter and leave the network at any time.

With the system and processes shown in, once a block is formed, the block cannot be changed without redoing the work to satisfy census rules thereby securing the block from tampering. A malicious attacker would need to provide proof standard for each block subsequent to the one he/she seeks to modify, race all other nodes, and overtake the majority of the system to affect change to an earlier record in the blockchain.

In some embodiments, blockchain may be used to support a payment system based on cryptographic proof instead of trust, allowing any two willing parties to transact directly with each other without the need for a trusted third party. Bitcoin is an example of a blockchain backed currency. A blockchain system uses a peer-to-peer distributed timestamp server to generate computational proof of the chronological order of transactions. Generally, a blockchain system is secure as long as honest nodes collectively control more processing power than any cooperating group of attacker nodes. With a blockchain, the transaction records are computationally impractical to reverse. As such, sellers are protected from fraud and buyers are protected by the routine escrow mechanism.

In some embodiments, a blockchain may use to secure digital documents such as digital cash, intellectual property, private financial data, chain of title to one or more rights, real property, digital wallet, digital representation of rights including, for example, a license to intellectual property, digital representation of a contractual relationship, medical records, security clearance rights, background check information, passwords, access control information for physical and/or virtual space, and combinations of one of more of the foregoing that allows online interactions directly between two parties without going through an intermediary. With a blockchain, a trusted third party is not required to prevent fraud. In some embodiments, a blockchain may include peer-to-peer network timestamped records of actions such as accessing documents, changing documents, copying documents, saving documents, moving documents, or other activities through which the digital content is used for its content, as an item for trade, or as an item for remuneration by hashing them into an ongoing chain of hash-based proof-of-work to form a record that cannot be changed in accord with that timestamp without redoing the proof-of-work.

In some embodiments, in the peer-to-peer network, the longest chain proves the sequence of events witnessed, proves that it came from the largest pool of processing power, and that the integrity of the document has been maintained. In some embodiments, the network for supporting blockchain-based record keeping requires minimal structure. In some embodiments, messages for updating the record are broadcast on a best-effort basis. Nodes can leave and rejoin the network at will and may be configured to accept the longest proof-of-work chain as proof of what happened while they were away.

In some embodiments, a blockchain-based system allows content use, content exchange, and the use of content for remuneration based on cryptographic proof instead of trust, allowing any two willing parties to employ the content without the need to trust each other and without the need for a trusted third party. In some embodiments, a blockchain may be used to ensure that a digital document was not altered after a given timestamp, that alterations made can be followed to a traceable point of origin, that only people with authorized keys can access the document, that the document itself is the original and cannot be duplicated, that where duplication is allowed and the integrity of the copy is maintained along with the original, that the document creator was authorized to create the document, and/or that the document holder was authorized to transfer, alter, or otherwise act on the document.

As used herein, in some embodiments, the term blockchain may refer to one or more of a hash chain, a hash tree, a distributed database, and a distributed ledger. In some embodiments, blockchain may further refer to systems that uses one or more of cryptography, private/public key encryption, proof standard, distributed timestamp server, and inventive schemes to regulate how new blocks may be added to the chain. In some embodiments, blockchain may refer to the technology that underlies the Bitcoin system, a "sidechain" that uses the Bitcoin system for authentication and/or verification, or an alternative blockchain ("altchain") that is based on bitcoin concept and/or code but are generally independent of the Bitcoin system.

Descriptions of embodiments of blockchain technology are provided herein as illustrations and examples only. The concepts of the blockchain system may be variously modified and adapted for different applications.

In some embodiments, an apparatus and a corresponding method performed by the apparatus comprises creating, at a content creator server based on content, a block, wherein the block includes the content, publishing, by the content creator server to a public ledger, the block, wherein the public ledger comprises a blockchain, generating, for a user device, a key, wherein the key provides digital rights access to the block, transmitting, to the user device via a network, the key, storing, by the user device, a local copy of the public ledger, updating, based on the publishing the block to the public ledger, the local copy of the public ledger to include the block, receiving, from the content creator server via the network, the key, and accessing, via the local copy of the public ledger with the key, the block, wherein access to the block allows the user device to make use of the content.

Those skilled in the art will recognize that a wide variety of other modifications, alterations, and combinations can also be made with respect to the above described embodiments without departing from the scope of the invention, and that such modifications, alterations, and combinations are to be viewed as being within the ambit of the inventive concept.

What is claimed is:

1. A system for automatically authorizing digital rights access, the system comprising:
   a content creator server communicatively coupled to a network, wherein the content creator server is configured to:
   create, based on content, a block, wherein the block includes the content;
   publish, to a public ledger, the block, wherein the public ledger comprises a blockchain;
   generate, for a user device, a key, wherein the key provides digital rights access to the block; and
   transmit, to the user device via the network, the key; and
   the user device communicatively coupled to the network, the user device configured to:
   store a local copy of the public ledger;
   update, based on the publication of the block to the public ledger, the local copy of the public ledger to include the block;
   receive, from the content creator server, the key; and
   access, via the local copy of the public ledger with the key, the block, wherein access to the block allows the user device to make use of the content.

2. The system of claim 1, wherein the content creator server comprises multiple content creator servers.

3. The system of claim 2, wherein the multiple content creator servers include a first content creator server and a second content creator server, and wherein the first content creator server is associated with a first content creator and the second content creator server is associated with a second content creator.

4. The system of claim 1, wherein the content is software.

5. The system of claim 1, wherein the content is code for a software update.

6. The system of claim 1, wherein the user device is further configured to:
   transmit, via the network to the content creator server, payment, wherein the content creator server generates and transmits the key after receipt of the payment from the user device.

7. The system of claim 1, wherein the copy of the public ledger includes all previous and current versions of the content.

8. The system of claim 1, wherein the user device is further configured to:
 check for updates to the public ledger periodically.

9. The system of claim 1, wherein the content includes an executable file.

10. A method for automatically authorizing digital rights access, the method comprising:
 creating, at a content creator server based on content, a block, wherein the block includes the content;
 publishing, by the content creator server to a public ledger, the block, wherein the public ledger comprises a blockchain;
 generating, for a user device, a key, wherein the key provides digital rights access to the block;
 transmitting, to the user device via a network, the key;
 storing, by the user device, a local copy of the public ledger;
 updating, based on the publishing the block to the public ledger, the local copy of the public ledger to include the block;
 receiving, from the content creator server via the network, the key;
 accessing, via the local copy of the public ledger with the key, the block, wherein access to the block allows the user device to make use of the content.

11. The method of claim 10, wherein the content creator server comprises multiple content creator servers.

12. The method of claim 11, wherein the multiple content creator servers include a first content creator server and a second content creator server, and wherein the first content creator server is associated with a first content creator and the second content creator server is associated with a second content creator.

13. The method of claim 10, wherein the content is software.

14. The method of claim 10, wherein the content is code for a software update.

15. The method of claim 10, further comprising:
 transmitting, by the user device via the network to the content creator server, payment, wherein the generating and transmitting the key occurs after receipt of the payment from the user device.

16. The method of claim 10, wherein the copy of the public ledger includes all previous and current versions of the content.

17. The method of claim 10, further comprising:
 checking, by the user device, for updates to the public ledger periodically.

18. The method of claim 10, wherein the content includes an executable file.

* * * * *